April 16, 1935.  W. F. NAATZ ET AL  1,998,056
BALANCED CHECK VALVE
Filed Jan. 24, 1933
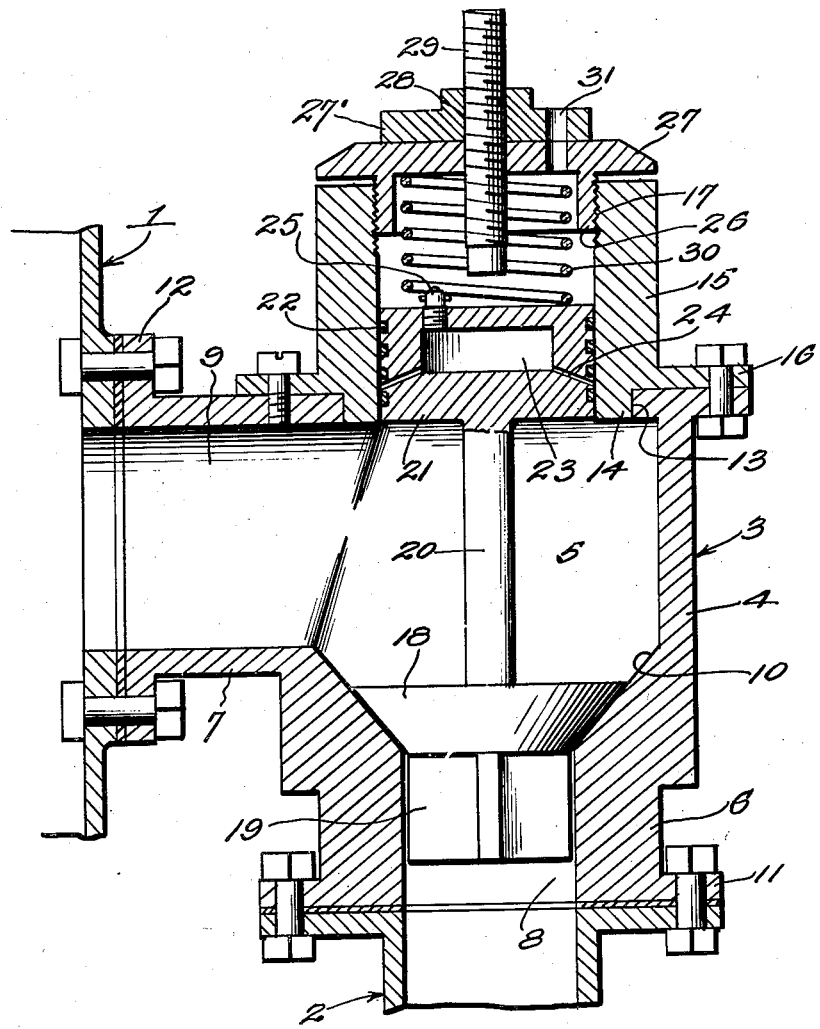
Inventor
W. F. Naatz, R. E. Eckert
Jesse W. Barnes
By Watson E. Coleman
Attorney Patented Apr. 16, 1935

1,998,056

UNITED STATES PATENT OFFICE 1,998,056

BALANCED CHECK VALVE

William F. Naatz, Richard E. Eckert, and Jesse W. Barnes, Oneonta, N. Y.

Application January 24, 1933, Serial No. 653,342

2 Claims. (Cl. 251—145)

This invention relates to the class of valves and pertains particularly to a check valve.

The primary object of the present invention is to provide a balanced check valve which, although it may be used in any desirable location, is designed particularly for use upon steam boilers to be actuated by the feed water pressure for the admission of water to the boiler when required.

Another object of the invention is to provide a balanced check valve of novel design and having novel lubricating means for a sliding element thereof.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

The figure represents a longitudinal sectional view through the valve structure embodying the present invention, showing the two connections thereto.

Referring now more particularly to the drawing wherein like numerals of reference indicate corresponding parts throughout the several views, the numeral 1 indicates generally a portion of a boiler with which the valve is connected through which water or steam passes from the pipe 2.

The valve embodying the present invention is indicated as a whole by the numeral 3. This valve comprises a body 4 having a central chamber 5, and the two arms 6 and 7 which form the tubular passageways 8 and 9 respectively.

At the inner end of the passage 8 the wall of the body is formed to provide the valve seat 10 and at the outer end of each of the passages the arms are formed to provide the flanges 11 and 12 by which they are coupled respectively with the pipe 2 and boiler 1 in the manner illustrated.

The wall of the body 4 directly above or opposite the inlet end of the passage 8 is provided with the opening 13 into which fits the annular end 14 of a tubular head-piece 15. This head 15 is provided with a flange 16 by which it is fastened to the body 4 of the valve as shown and at its outer end the head is interiorly threaded as indicated at 17.

Within the valve body 4 is a valve disk 18 which normally seats upon the seat 10 and the under side or face of this disk is provided with the guide ribs 19 which slidably extend into the passage 8 in the manner shown.

From the top surface of the valve disk 18 there extends across the chamber 5 the stem 20 which at its other end is integral with the piston head 21 which is slidably and snugly positioned in the head 15. This piston 21 is preferably provided with the packing rings 22 which engage the inner wall of the head in which the piston moves and which prevent the escape of the pressure fluid in the valve.

The piston 21 is provided with a chamber 23 from which lead outwardly the small passageways 24 which open through the outer surface of the piston preferably between the innermost pair of rings. The head of the piston is fitted with a suitable valved coupling 25 which opens into the chamber 23 and which facilitates the injection, under pressure, of grease into the chamber.

Engaged with the threads 17 upon the inner surface of the head 15, are threads formed about the exterior of the sleeve portion 26 of a cap 27 which closes the outer end of the head 15. This cap 27 is provided with a central threaded passage 28 in which is threaded the stem 29, the inner end of which is normally spaced from the piston 21 and operates to limit the movement of the piston. Interposed between the piston and the cap 27 is a compression spring 30, which is so adjusted that when the piston 21 is in the position illustrated no pressure will be exerted thereon by the spring.

The cap 27 is provided with an aperture 31 which permits of the escape of any steam which may work past the piston 21 and also provides a means for injecting lubricating oil into the head 15 if this is found desirable.

In practice it is preferred that the total area of the top surface of the disk valve 18, that is the surface facing toward the chamber 5, be approximately twice the area of the surface of the piston 21 which is presented to the interior of the chamber 5 and that the surface area of the underside of the disk valve 18 from which the guides 19 extend, be slightly smaller than the area of the inner face of the piston 21.

In operation, when feed water is forced against the underside of check valve 18 with a pressure greater than the boiler pressure, the valve is lifted from its seat by this pressure. As the valve 18 leaves its seat, the spring 30 checks to a certain extent, the upward thrust and cushions the opening of the valve. When the feed water pressure falls below the boiler pressure, the spring 30 together with the boiler pressure acting on the large upper surface of the valve 18 forces this valve to its seat and the pressure which is against the under surface of the piston 21 acts to retard the movement of valve 18 and prevent it closing too hard. The boiler side of valve 18 has a surface area slightly less than the combined areas of the underside of the piston 21 and the underside of the valve 18. Therefore, the entering feed water has to reach a pressure slightly greater than the boiler pressure in order to effect the opening of the valve so that the feed water may enter the boiler. As will be readily apparent, as soon as the feed water pressure falls below that of the boiler, the boiler pressure acting upon the large upper surface of the valve 18, coupled with the spring, will effect the closing of the valve.

As previously described the stem 29 serves as a limiting means for the movement of the balancing piston 21 and in addition serves as a means whereby the balancing piston may be forced back to normal position in the event that it becomes stuck while the check valve is unseated.

It will also be readily apparent that by adjusting the position of the cap 27 the spring 30 may be caused to exert a slight pressure upon the balancing piston if this is found desirable or by backing out the sleeve 17 and the cap 27 the balancing piston may be permitted a greater degree of movement before the spring comes into play to oppose its movement.

After the cap 27 has been positioned to place the spring 30 under the required tension and the stem 29 has been adjusted to limit the movement of the piston 21 the stem may be fixed or secured by threading down thereon the nut 27' to the position in which it is shown or, in other words, until it abuts the top of the cap 27. This will hold the stem against movement from set position.

Having thus described the invention, what is claimed is:—

1. A valve comprising a body having an inlet and an outlet port and an opening through a wall opposite the inlet port, an interiorly cylindrical body secured to the valve body and opening at one end thereinto through said opening, the said valve body being formed to provide a tapered valve disk seat at the inner end of the inlet port, a valve disk normally positioned on said seat, a hollow piston within the interior of the second mentioned body, having an outlet passage through the side wall, a stem connecting the valve disk with the piston, means closing the outer end of the second mentioned body, resilient means interposed between said last means and the piston, and means for conducting lubricant into said piston for escape through said passage to lubricate the face of the piston which engages the wall of the second mentioned body.

2. A valve structure, comprising a hollow body having an inlet opening, an opening concentric with and in a wall opposite the inlet opening and a lateral outlet between the first two openings, a wide faced tapering valve seat formed at the inner end of the inlet opening and directed into the body, the narrowest end of said seat being nearest the outer end of the inlet opening, a cylindrical body having a flange adjacent one end and having an end annulus adapted to snugly fit into the second mentioned opening, the said flange being positioned against the outer side of the valve body, the inner surface of the cylindrical body being screw threaded adjacent the end opposite the flange, a cap having an exteriorly threaded flange threadable into the cylindrical body, a piston slidably disposed in the cylindrical body, a stem extending from said piston toward said inlet opening, a relatively thick disk valve carried upon the stem and having a broad tapered contact face seating on said valve seat, the face of said disk which is directed toward the inlet opening being of less diameter than the inner face of said piston and a spring member interposed between said piston and said cap, said valve disk being of smaller diameter than the second mentioned opening and further being of materially greater area on its inner face than the inner face of the piston.

WILLIAM F. NAATZ.
RICHARD E. ECKERT.
JESSE W. BARNES.